(12) United States Patent
Ma

(10) Patent No.: US 8,041,700 B2
(45) Date of Patent: Oct. 18, 2011

(54) CONTENT ITEM RETRIEVAL BASED ON A FREE TEXT ENTRY

(75) Inventor: Changxue Ma, Barrington, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 338 days.

(21) Appl. No.: 12/419,341

(22) Filed: Apr. 7, 2009

(65) Prior Publication Data

US 2010/0257166 A1    Oct. 7, 2010

(51) Int. Cl.
*G06F 7/00* (2006.01)
*G06F 17/30* (2006.01)

(52) U.S. Cl. ........ 707/706; 707/748; 707/750; 707/752; 704/4; 704/9

(58) Field of Classification Search .......... 707/706, 707/748, 750, 752; 704/7, 9
See application file for complete search history.

(56) References Cited

U.S. PATENT DOCUMENTS

| | | | |
|---|---|---|---|
| 6,401,084 | B1 | 6/2002 | Ortega et al. |
| 6,853,993 | B2 | 2/2005 | Ortega et al. |
| 7,321,892 | B2 | 1/2008 | Vadon et al. |
| 7,505,969 | B2 * | 3/2009 | Musgrove et al. ..... 707/999.005 |
| 2005/0256890 | A1 * | 11/2005 | Rajasekaran et al. ......... 707/100 |
| 2006/0167872 | A1 * | 7/2006 | Parikh ................................ 707/6 |
| 2006/0265668 | A1 * | 11/2006 | Rainisto ......................... 715/816 |
| 2006/0271353 | A1 * | 11/2006 | Berkan et al. ..................... 704/9 |
| 2007/0192318 | A1 | 8/2007 | Ramer et al. |
| 2007/0244866 | A1 * | 10/2007 | Mishkanian et al. ............. 707/3 |
| 2008/0243514 | A1 * | 10/2008 | Gopinath et al. ............. 704/270 |
| 2008/0270119 | A1 * | 10/2008 | Suzuki ............................... 704/9 |
| 2009/0234847 | A1 * | 9/2009 | Homma et al. ................... 707/5 |
| 2011/0055192 | A1 * | 3/2011 | Tang et al. ..................... 707/706 |

OTHER PUBLICATIONS

Wang et al.—"Keyword Indexing System with Hownet and PageRank"—Networking, Sensing and Control, Apr. 6-8, 2008, ICNSC 2008, IEEE, International Conference (pp. 389-393).*
Marks S. Ackerman—"Augmenting Organizational Memory: A field Study of Answer Garden"—ACM Transactions on Information Systems (TOIS), vol. 16, Issue 3, Jul. 1998 (pp. 203-224).*
Cavner, "N-Gram-Based Text Filtering for TREC-2," Second Text Retrieval Conference (TREC-2), NIST, Aug. 30 through Sep. 1, 1993, XP002586935, Gaithersburg, MD, Chapters 1 and 2, 10 pages.
Faulk, "An Inductive Approach to Language Translation," Communications of the ACM, vol. 7, No. 11, Nov. 1964, pp. 647-653.
Shaw, et al., "Evaluation of Automatically Reformulated Questions in Question Series," Coling 2008: Proceedings of the 2nd Workshop on Information Retrieval for Question Answering, Aug. 2008, pp. 58-65.
Rainer Hauck, "Corresponding Application PCT/US2010/028567—PCT International Search Report and Written Opinion," WIPO, ISA/EP, European Patent Office, Rijswijk, Netherlands, Jul. 2, 2010, 11 pages, most relevant 5-6 and 9-11.

* cited by examiner

*Primary Examiner* — Jean B Fleurantin
*Assistant Examiner* — Anh Ly

(57) ABSTRACT

A method and apparatus for textual searching of a database is provided herein. During operation a user will input a letter into a search engine. The search engine will score words based on the letter and display results of the highest-scored words. Another letter will again be received and the process repeated. In situations where titles are returned to the user, additional steps of associating the words with a title and scoring the title take place. The highest-scored titles are provided to the user as the displayed results.

6 Claims, 2 Drawing Sheets

100

CONTENT ITEM RETRIEVAL BASED ON A FREE TEXT ENTRY

FIELD OF THE INVENTION

The present invention relates generally to textual searching of databases and in particular, to content item retrieval from databases based on a text entry.

BACKGROUND OF THE INVENTION

The use of many electronic devices capable of searching databases has become widespread. For example, a television set-top box used as a multi-media device often has the capability of searching an electronic program guide (EPG) based on a textual input. Often times the searches require large strings of text to be input by the user. The shift of focus across the screen takes time for motor, visual, cognitive processing. This time-consuming process may lead to input error. Therefore a need exists for a method and apparatus for textual searching of databases on electronic devices that is robust to input errors and minimizes the amount of input efforts required from a user.

Figure 1:
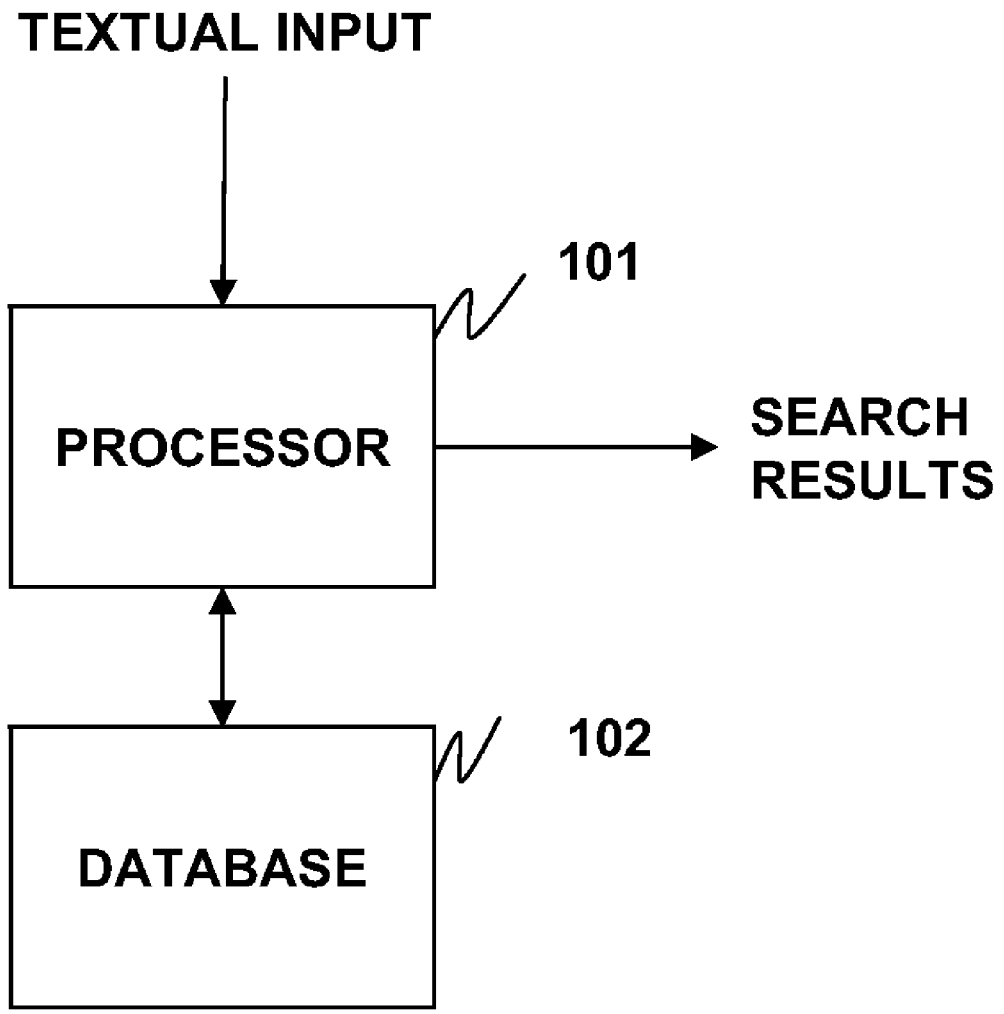
FIG. 1 is a block diagram showing an apparatus used for text entry.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE DRAWINGS

In order to alleviate the above-mentioned need, a method and apparatus for textual searching of a database is provided herein. During operation a user will input a letter into a search engine. The search engine will score words based on the letter and display results of the highest-scored words. Another letter will again be received and the process repeated. In situations where titles are returned to the user, additional steps of associating the words with a title and scoring the title take place. The highest-scored titles are provided to the user as the displayed results.

When scoring words, a technique is utilized that does not require a user to enter a string of characters in an exact order as a word in the database to identify the word in the database. For example, to find an word consisting of the word "six", user may just enter "s" and "x". Words are scored a value in proportion to how many letters they have that are similar to the search string. Additionally, words are scored a higher value if they contain letters in an exact order as contained in the search string. So, for example, even though the word "avalanche" and "avenged" both contain the letters "v" and "a", the word "avalanche" will be scored higher if the search string is "va", while the word "avenged" will be scored higher if the search string is "av".

The above technique provides users with a convenient way to search a database that allows minimal textual input, which allows user to input characters in free format in a very casual manner to reduce attention demands and while not distracting focus of the attention from entertainment. A user can enter a distinctive letter string as conceived in the user's mind to quickly identify the searched items. Unlike predictive text entry, (which requires the correct spelling to find the items), the above technique may be able to allow users to minimize the keys used for text entry.

Turning now to the drawings, where like numerals designate like components, FIG. 1 is a block diagram showing apparatus 100 used for text entry. Apparatus 100 may be incorporated into any electronic device that is capable of searching databases. Such devices include, but are not limited to TV set-top boxes, cellular telephones, Personal Digital Assistants (PDAs), personal computers, . . . , etc.

As shown, apparatus 100 comprises an electronic processor 101 and database 102. Processor 101 comprises logic circuitry such as a digital signal processor (DSP), general purpose microprocessor, a programmable logic device, or application specific integrated circuit (ASIC) and is utilized to search database 102. Database 102 comprises standard random access memory and is used to store information that can be textually searched. Such information includes, but is not limited to electronic program guides (EPGs), song titles, photo tagged by text, etc.

During operation of apparatus 100, textual input is received by processor 101. The textual input may be from a keyboard, a voice command, a pointing device, or any other means for providing letters to processor 101. In response, processor 101 will score words within database 102. As discussed above, processor 101 will score words based on the letter received and display results of the highest-scored words. Another letter will again be received and the process repeated. In situations where titles are returned to the user, additional steps of associating the words with a title and scoring the title take place. The highest-scored titles are provided to the user as the displayed results.

Scoring Words

As discussed above, when scoring words, a technique is utilized that does not require a user to enter a string of characters in an exact order as contained within a word the database to identify the word in the database. For example, to find an item consisting of the word "six", user may just enter "s" and "x" on the soft keyboard on the screen. Words are scored a value in proportion to how many letters they have that are similar to the search string (textual input). Additionally, words are scored a higher value if they contain letters in an exact order as contained in the search string. So, for example, even though the word "avalanche" and "avenged" both contain the letters "v" and "a", the word "avalanche" will be scored higher if the search string is "va", while the word "avenged" will be scored higher if the search string is "av".

Other examples are:

The search string "nn" can return words "cnn" and "thinner"

The search string "fer" can return the word "winfery"

The search string "nnoo" can return words "look" and "thinner"

The search string "kll" can return word "Kelly"

The search string "ssx" can return words "six"

The scoring of words takes place by initializing a score accumulator (sword) to zero. For the current input letter, strings of single letter, bi-letter, tri-letter, etc are formed by pre-pending the previously-supplied inputs. The match of an M-letter string at depth x produces a score of $\mu_M(x)$. Thus, the match of a single letter in a word at depth x produces a score $\mu_1(x)$. The match of a bi-letter in a word at depth x produces a bi-letter score $\mu_2(x)$, and so on. With the above in mind:

$$sword = sword * f + (\mu_1(x) + \mu_2(x) + \ldots + \mu_n n(x)).$$

Where:

f is a forgetting factor to gradually discount the contribution of past inputs. For example, if f=1, there is no forgetting factor. If forgetting factor is used we set f=0.97. Alternatively, $$sword = \mu_1(x) + \mu_2(x) + \ldots + \mu_n(x).$$

So, for example, if for a single input letter of "s", the following score would be returned:

| Word | Score |
| --- | --- |
| Shoe | $\mu_1(1)$ |
| Basket | $\mu_1(3)$ |
| Sneakers | $\mu_1(1) + \mu_1(8)$ |
| Baseballs | $\mu_1(3) + \mu_1(9)$ |

For a double letter input of "sc", the following score would be returned:

| Word | Score |
| --- | --- |
| soccer | $\mu_1(1) + \mu_1(3) + \mu_1(4)$ |
| sample | $\mu_1(1)$ |
| screen | $\mu_1(1) + \mu_1(2) + \mu_2(1)$ |
| screws | $\mu_1(1) + \mu_1(2) + \mu_2(1) + \mu_1(6)$ |

Considering that a higher score represents a better match of a search string with a particular word, the values for $\mu_M(x)$ are chosen to increase as M increases, and decrease as x increases. Thus, the value for $\mu_M(x)$ is proportional to M and inversely proportional to x. Some sample values for $\mu_M(x)$ are given below with all numerical values being exemplary in nature:

| | x | | | |
| --- | --- | --- | --- | --- |
| M | 1 | 2 | 3 | 4 |
| 1 | $\mu_1(1) = 3$ | $\mu_1(1) = 2$ | $\mu_1(1) = 1.6$ | $\mu_1(1) = 1.5$ |
| 2 | $\mu_2(1) = 0$ | $\mu_2(2) = 11$ | $\mu_2(2) = 10.6$ | $\mu_2(2) = 10.5$ |

The score for a particular word can be also estimated from the letter-word occurrences based on the database and heuristics on human behavior modeling. The score can be further processed by a function such as normalization by the number of letters in the word.

Scoring Titles

As discussed above, titles may be returned to the user of apparatus 100. When returning titles (e.g., EPG show titles), the score for the words are converted into scores for titles. As an example:

The search string "nn" can return titles "cnn", "look thinner"

The search string "fer" can return title "opera winfery"

The search string "nnoo" can return title "look thinner"

The search string "kll" can return title "Live With Regis and Kelly"

The search string "ssx" can return title "six sense"

A number of highest-scored titles are presented to the user. A score for each title (tscore) comprises a function of individual word scores, and is determined by first setting tscore to zero. Then for each of the N words in the title ($w_1, w_2, \ldots, w_N$), Tscore is calculated as:

$$Tscore = \left( \sum_{n=1}^{N} sword(w_n) + \beta * \log(Z/i(w_n)) \right)$$

Where $i(w_n)$ is a number of titles having the word $w_n$, Z is the size of titles in the database and $\beta$ is determined experimentally to control the reward score given to words appearing less often across the selected titles. For example, $\beta=10$.

Alternatively, Tscore may simply comprise a summation of the individual word ($w_1, w_2, \ldots, w_N$) scores in the title, so that:

$$Tscore = \sum_{n=1}^{N} sword(w_n)).$$

Figure 2:
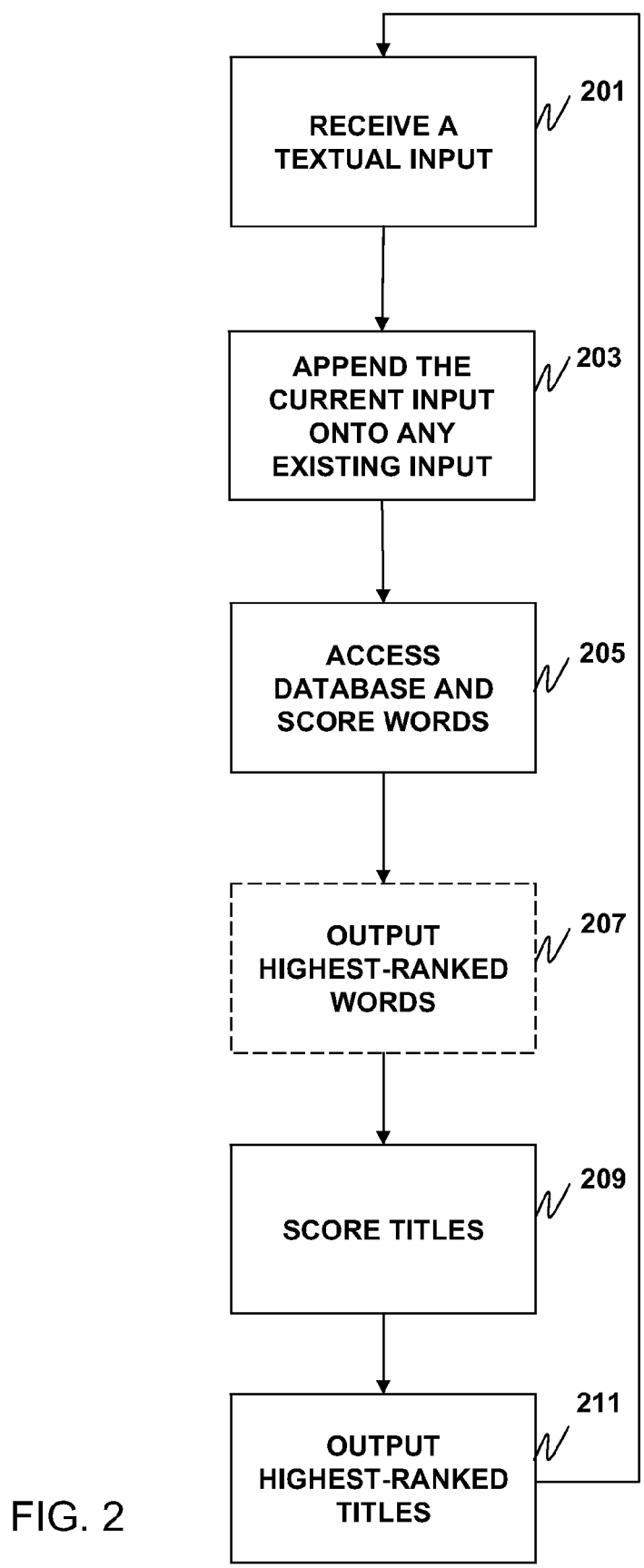
FIG. 2 is a flow chart showing the operation of the apparatus of FIG. 1.

FIG. 2. is a flow chart showing the operation of the apparatus of FIG. 1. As discussed above, apparatus 100 comprises processor 101 for determining search results based on textual input, and database 102. Database 102 comprises a plurality of words, and optionally comprises a plurality of titles derived from the words.

The logic flow begins at step 201 where processor 101 receives a textual input (search string). Processor 101 appends the current input onto any existing input at step 203 to form an updated search string, and the logic flow continues to step 205. At step 205 database 102 is accessed by processor 101 and all words within database 102 are scored by processor 101 based on the current input and any existing input.

Each word within database 102 receives a score proportional to a number of letters within the search string and the depth of the string within the word. As discussed above, the score of each word comprises a summation of a score for each letter in the textual input, along with a summation of a score for each combination of letters in the search string. Thus, if a textual input comprises "xyz" each word within database will receive a summation score that is a summation of the score for "x", the score for "y", the score for "z", the score for "xy", the score for "yz", and the score for "xyz". Additionally each word's score for a particular string is proportional to a number of letters within the string (M) and the depth of the string (x) within the word.

At this point in the logic flow (step 207), processor 101 may output the highest scored words as a search result, however, if titles are to be returned as a search result, then the logic flow skips step 207 and proceeds directly to step 209 where each title within the database is scored by processor 101. As discussed above, each title comprise a plurality of scored words, and a score for each title is proportional to a summation of the individual scores of each word in the title. A score for each title (tscore) is determined by summing over the individual word $(w_1, w_2, \ldots, w_N)$ scores in the title. Thus, the score for each title is proportional to the individual scores of each word in the title. Finally, at step 211 search results comprising titles are output by processor 101. The logic flow then returns to step 201 where processor awaits another letter to append to the search string (textual input).

While the invention has been particularly shown and described with reference to a particular embodiment, it will be understood by those skilled in the art that various changes in form and details may be made therein without departing from the spirit and scope of the invention. It is intended that such changes come within the scope of the following claims:

The invention claimed is:

1. A method comprising the steps of:
receiving by an electronic processor, a textual input;
appending the textual input to a previously supplied textual input to form a search string;
accessing by the electronic processor, a database comprising a plurality of words; and
determining by the electronic processor, a score (sword) for words in the database based on the search string, wherein sword=$(\mu_1(x)+\mu_2(x)+ \ldots +\mu_n(x))$, where a match of an M-letter search string at depth x in a word produces a score of $\mu_M(x)$,
determining, by the electronic processor, scores (Tscore) for a plurality of titles within the database, wherein a title within the database comprises a plurality of scored words, and wherein a score for each title is proportional to a summation of individual scores of each word in the title;
wherein for each of N words in the title $(w_1,w_2, \ldots w_N)$, Tscore is calculated as:

$$Tscore = \left(\sum_{n=1}^{N} \text{sword}(w_n) + \beta * \log(Z/i(w_n))\right),$$

where $i(w_n)$ is a number of titles having the word $w_n$, Z is a size of titles in the database and $\beta$ is determined experimentally to control a reward score given to words appearing less often across titles; or Tscore is calculated as:

$$Tscore = \sum_{n=1}^{N} \text{sword}(w_n)).$$

2. The method of claim 1 wherein sword=sword*f+$(\mu_1(x)+\mu_2(x)+ \ldots +\mu_n(x))$, where f is a forgetting factor to gradually discount the contribution of past inputs.

3. An apparatus comprising:
a database comprising a plurality of words;
a processor receiving a textual input (search string) and determining a score for words (sword) from database based on the search string, wherein a score for each word is proportional to a number of letters within the search string and the depth of the search string within the word;
wherein: the processor scores a plurality of titles within the database, wherein titles within the database comprise a plurality of scored words, and wherein a score for each title is proportional to a summation of the individual scores of each word in the title;
wherein for each of N words in a title $(w_1,w_2, \ldots, w_N)$, Tscore for the title is calculated as:

$$Tscore = \left(\sum_{n=1}^{N} \text{sword}(w_n) + \beta * \log(Z/i(w_n))\right),$$

where $i(w_n)$ is a number of titles having the word $w_n$, Z is a size of titles in the database and $\beta$ is determined experimentally to control a reward score given to words appearing less often across the titles, or Tscore for the title is calculated as:

$$Tscore = \sum_{n=1}^{N} \text{sword}(w_n)).$$

4. The apparatus of claim 3 wherein the processor outputs a plurality of words having a highest score.

5. The apparatus of claim 3 wherein the processor outputs a plurality of titles having a highest score.

6. The apparatus of claim 3 wherein a score (sword) for each word is based on the search string, and wherein sword=$(\mu_1(x)+\mu_2(x)+ \ldots +\mu_n(x))$, where a match of an M-letter string at depth x in a word produces a score of $\mu_M(x)$.

* * * * *